Patented July 3, 1928.

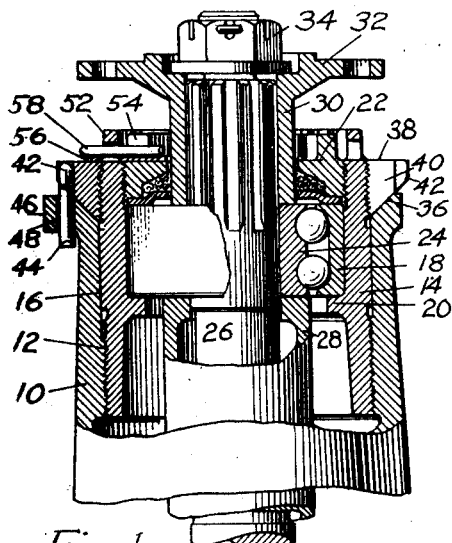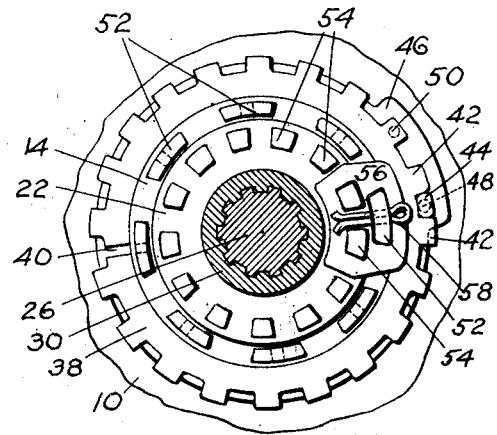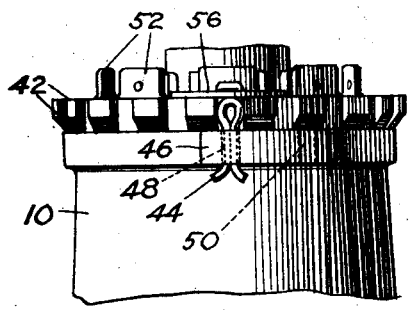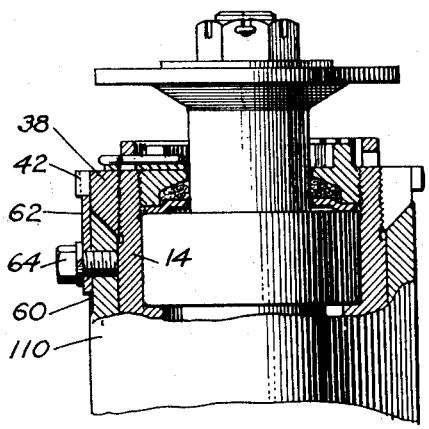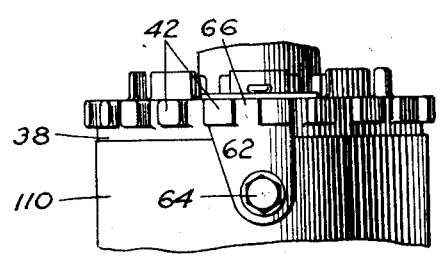

1,675,624

UNITED STATES PATENT OFFICE.

HERBERT BERNARD TAYLOR, OF SYRACUSE, NEW YORK, ASSIGNOR TO GENERAL MOTORS CORPORATION, OF DETROIT, MICHIGAN, A CORPORATION OF DELAWARE.

LOCKING DEVICE.

Application filed January 30, 1925. Serial No. 5,794.

This invention relates to locking devices and is herein shown as embodied in means for locking a differential pinion adjusting sleeve to a tubular carrier.

Automobiles commonly have a differential pinion at the rear end of a stub shaft mounted in axially movable bearings one of which is carried by an adjusting sleeve threaded in a tubular carrier extending forwardly from the rear axle. Hitherto, it has been the practice to split the carrier and provide a clamping bolt to tighten the carrier on the sleeve after the latter has been adjusted. This results in a distortion of the carrier. To prevent play in the anti-friction bearing, the latter must be clamped in the sleeve and prior locking devices have not made suitable provision for the fine adjustment needed. Accordingly it is an object of this invention to provide improved locking means for locking the sleeve in the carrier and for locking the bearing in the sleeve.

To these ends and also to improve generally upon devices of the character indicated my invention consists in the various matters hereinafter described and claimed.

In the drawing Fig. 1 is a plan view broken away to show some parts in central section, Fig. 2 is a transverse section showing some parts in end elevation, Fig. 3 is a side elevation.

Fig. 4 is a view similar to Fig. 1 showing a modified construction and

Fig. 5 is a side elevation of Fig. 4 with parts broken off.

The numeral 10 indicates a tubular carrier which extends forwardly from a rear axle casing and carries the adjustable bearings for a differential pinion shaft. The carrier has an interior threaded portion 12 to receive threads on the exterior of an adjusting sleeve or bushing 14, the latter having also a smooth cylindrical portion 16 which has a continuous peripheral engagement with a similar surface in the unsplit end of the carrier 10. An outer race ring 18, of a double-row ball bearing, is seated in the sleeve against a shoulder 20 and is held by a clamping ring 22 threaded in the sleeve and having a suitable washer and packing to retain grease. An inner race ring 24 for the bearing is clamped to the pinion shaft 26, abutting against a spacing sleeve 28 and held there by the hub 30 of a member 32 which is universally connected to the usual propeller shaft and locked to the pinion shaft by a nut 34.

The tubular carrier 10 has an interior conical face 36 at its end engaged by a complemental exterior conical face on a locking ring 38 which is threaded on the sleeve 14 and split, as at 40. Turning the locking ring causes it to contract, the conical faces wedging it inwardly and firmly locking the sleeve without any tendency to distort the carrier or interfere with the continuous peripheral engagement or fit between the sleeve and the carrier. The locking ring 38 has a series of closely spaced radial projections or lugs 42, any two adjacent lugs being designed to straddle a pin 44 which may be inserted selectively in any one of a plurality of axial openings cut in a flange 46 on the carrier. The pin 44 is shown in one opening 48, and another opening 50 is located a distance from the first equal to one and a half times the distance between the centers of adjacent lugs. Hence, a fine adjustment of the locking ring may be obtained inasmuch as a turning of the ring half the distance between the lugs will give a new locking position in which the pin 44 is inserted in the hole 50.

Means is provided for locking the clamping ring 22 to the sleeve 14 with a fine adjustment. In one desirable construction, the sleeve has a plurality of axial lugs 52, herein shown as eight, and the ring preferably has a greater and an uneven number of axial lugs 54, herein shown as eleven. A flat locking plate 56, with three openings, two to engage adjacent lugs 54 on the ring and one to engage one of the lugs 52 on the sleeve, is arranged to be slipped over such lugs as have the proper spaced relation to lock the clamping ring 22 in its desired position. The lugs 52 are bored radially to receive a cotter pin 58 which holds the locking plate 56, the adjacent lugs 54 straddling the pin. The clamping ring 22 is shown locked to the sleeve in one position and it is apparent that it can be locked in a multitude of different positions by selecting suitably located lugs for the locking plate.

In Figs. 4 and 5, the construction is similar but the carrier 10 has no flange and a different lock for the ring 38 is provided. The carrier has a shallow slot 60 in which a plate 62 is fastened by a screw bolt 64. The plate has an extension or finger 66 at the end arranged to fit between adjacent lugs 42. The finger is shown arranged at one side of the center of the plate a distance equal to one fourth of the distance between the center lines of adjacent lugs. Hence, another intermediate locking position can be obtained by turning the plate over and refastening it in a position such that its finger is on the other side of the center line.

Although the invention has been described by reference to certain specific constructions, it should be understood that, in its broader aspects, it is not necessarily limited to the forms selected for mere illustrative purposes.

I claim:

1. In a device of the character described, in combination, a tubular carrier having a flange at one end, a sleeve adjustably mounted in said carrier, a locking ring threaded on said sleeve and having a plurality of spaced lugs, a locking pin to engage between adjacent lugs, and said flange having openings spaced apart a distance different from the spacing of said lugs and adapted to selectively receive said locking pin.

2. In a device of the character described, in combination, a tubular carrier, a sleeve adjustably mounted in said carrier, a locking pin, a locking ring threaded on said sleeve and having means for selectively engaging said pin, and means on said carrier for selectively receiving said pin.

3. In a differential carrier, in combination, a tubular carrier, a pinion adjusting sleeve mounted in the carrier and having a series of spaced lugs, a clamping ring threaded in said sleeve and having a different number of spaced lugs, and a plate having openings arranged to selectively receive lugs on the sleeve and the ring.

4. In a differential carrier, in combination, a tubular carrier, a pinion adjusting sleeve mounted in the carrier and having a series of spaced lugs, a clamping ring threaded in said sleeve and having a different number of spaced lugs, one set of said lugs having openings, a plate having openings arranged to selectively receive lugs on the sleeve and the ring, and a locking pin arranged to be selectively positioned in the openings of the lugs outside the plate.

5. In a differential carrier, in combination, a tubular carrier, a pinion adjusting sleeve mounted in the carrier and having a series of axially extending lugs, a bearing clamping ring threaded in said sleeve and having a different number of axially extending lugs arranged inside said first mentioned lugs, one set of said lugs having radial openings, a flat plate having openings arranged to selectively receive adjacent lugs on the sleeve and the ring, and a locking pin arranged to be selectively positioned in the radial openings of the lugs outside the plate.

In testimony whereof I affix my signature.

HERBERT B. TAYLOR.